US012391781B2

(12) United States Patent
Ishii et al.

(10) Patent No.: US 12,391,781 B2
(45) Date of Patent: Aug. 19, 2025

(54) BLACK PARTICLES, BLACK COATING MATERIAL, COATING FILM, AND BLACK MATRIX FOR COLOR FILTERS

(71) Applicant: SEKISUI CHEMICAL CO., LTD., Osaka (JP)

(72) Inventors: Masahiro Ishii, Osaka (JP); Ren-de Sun, Osaka (JP); Hiroji Fukui, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 683 days.

(21) Appl. No.: 17/775,684

(22) PCT Filed: Nov. 17, 2020

(86) PCT No.: PCT/JP2020/042775
§ 371 (c)(1),
(2) Date: May 10, 2022

(87) PCT Pub. No.: WO2021/100699
PCT Pub. Date: May 27, 2021

(65) Prior Publication Data
US 2022/0411553 A1 Dec. 29, 2022

(30) Foreign Application Priority Data
Nov. 18, 2019 (JP) .................. 2019-208048

(51) Int. Cl.
*C08F 232/08* (2006.01)
*C08F 234/00* (2006.01)
(Continued)

(52) U.S. Cl.
CPC .......... *C08F 232/08* (2013.01); *C08F 234/00* (2013.01); *C09D 5/032* (2013.01); *C09D 201/025* (2013.01); *C09D 201/06* (2013.01)

(58) Field of Classification Search
CPC ............ G02F 1/133512; G02F 232/08; C08G 61/124; C08G 2261/3221; C09D 165/00;
(Continued)

(56) References Cited

U.S. PATENT DOCUMENTS 6,254,940 B1 * 7/2001 Pratsinis ................ C01B 13/24
423/625
2014/0086862 A1 3/2014 Nakamura et al.
(Continued)

FOREIGN PATENT DOCUMENTS

CN 109251326 1/2019
CN 110168022 8/2019
(Continued)

OTHER PUBLICATIONS

International Search Report issued Jan. 19, 2021 in International (PCT) Application No. PCT/JP2020/042775.
(Continued)

*Primary Examiner* — Sophie Hon
(74) *Attorney, Agent, or Firm* — Wenderoth, Lind & Ponack, L.L.P.

(57) ABSTRACT

The present invention provides black particles that have high electrical insulation and that can achieve high blackness in the visible light region, as well as a black coating material, a coating film, and a black matrix for a color filter each containing the black particles. Provided are black particles containing a copolymer including a structural unit derived from a pyrrole compound and a structural unit derived from a quinone compound, the black particles having an aqueous dispersion number average particle size of 100 nm or less and a zeta potential of −5 mV or less.

8 Claims, 3 Drawing Sheets

(51) Int. Cl.
  *C09D 5/03* (2006.01)
  *C09D 201/02* (2006.01)
  *C09D 201/06* (2006.01)

(58) Field of Classification Search
  CPC ... C09D 175/14; C09D 201/00; C08F 232/08; C08L 65/00
  See application file for complete search history.

(56) References Cited

U.S. PATENT DOCUMENTS

| | | | |
|---|---|---|---|
| 2018/0354798 A1 | 12/2018 | Sun et al. | |
| 2019/0338130 A1 | 11/2019 | Ozako | |

FOREIGN PATENT DOCUMENTS

| | | | | |
|---|---|---|---|---|
| CN | 114502677 B | * | 11/2023 | ........... C09D 201/00 |
| EP | 2 146 230 | | 1/2010 | |
| JP | 9-31353 | | 2/1997 | |
| JP | 2008150428 A | * | 7/2008 | |
| JP | 2012-072264 | | 4/2012 | |
| JP | 7642376 B2 | * | 3/2025 | ........... C09D 201/06 |
| WO | 2012/132533 | | 10/2012 | |
| WO | 2017/142087 | | 8/2017 | |
| WO | 2018/207699 | | 11/2018 | |
| WO | WO-2018207699 A1 | * | 11/2018 | ............. C08G 61/12 |

OTHER PUBLICATIONS

Stejskal, Jaroslav et al., "Oxidation of pyrrole with *p*-benzoquinone to semiconducting products and their application in electrorheology", New Journal of Chemistry, 2018, vol. 42, No. 12, pp. 10167-10176.

Kowalik, Janusz et al., "New Alternating Conductive Heteropolymers", Synthetic Metals, 1991, vol. 41, No. 1-2, pp. 435-438.

Claude Lion, et al., "Reaction of Pyrroles with Naphthoquinones. Synthesis of New Pyrrolynaphthoquinone Dyes", J. Heterocyclic Chem., vol. 37, (2000), pp. 1635-1640.

* cited by examiner

BLACK PARTICLES, BLACK COATING MATERIAL, COATING FILM, AND BLACK MATRIX FOR COLOR FILTERS

TECHNICAL FIELD

The present invention relates to black particles that have high electrical insulation and that can achieve high blackness in the visible light region, as well as to a black coating material, a coating film, and a black matrix for a color filter each containing the black particles.

BACKGROUND ART

Image display devices such as liquid crystal color displays include color filters for displaying multicolor images. Such color filters need to include light shielding members called black matrix for preventing color mixing between color resists or light leakage during black display.

Thin metal films such as chromium films have been used as black matrix materials. However, thin metal films disadvantageously have high light transmittance and impose a considerable burden on the environment. For this reason, resin compositions containing black pigments such as titanium black or carbon black dispersed in resins are commonly used as black matrix materials.

Unfortunately, titanium black used in resin compositions easily settles because it has a relatively high specific gravity of 3 or higher. Additionally, since titanium black is produced by partially nitriding titanium oxide, which has a large band gap, many titanium black pigments are brownish and have insufficient blackness.

Carbon black is naturally electrically conductive, which makes it difficult to form a coating film having sufficient insulation. Carbon black thus may make black matrix conductive, causing display defects. One technique that has been used to improve the coloring properties of carbon particles is to increase their particle size. However, carbon particles with large particle sizes easily settle when mixed in coating materials, reducing dispersibility or fluidity. Moreover, carbon black or other similar carbon particles easily coagulate because of their insufficient monodispersity.

In such a situation, Patent Literature 1 discloses black particles containing amorphous carbon that is derived from carbon contained in an oxazine resin. The black particles have a specific gravity of 1.8 $g/cm^3$ or less, a zeta potential of −70 to +80 mV, and an average total light reflectance measured at a wavelength of 400 to 800 nm of 5% or less, and a peak intensity ratio between G band and D band of 1.2 or more.

Non-Patent Literature 1 discloses a product with a globular morphology obtained by reacting pyrrole and p-benzoquinone in a methanesulfonic acid solution. Non-Patent Literature 1 discloses that products prepared in the absence of acid or at high acid concentration are non-conductive.

CITATION LIST

Patent Literature

Patent Literature 1: WO 2017/142087

Non-Patent Literature

Non-Patent Literature 1: New J. Chem., 2018, 42, 10167-10176 "Oxidation of pyrrole with p-benzoquinone to semiconducting products and their application in electrorheology"

SUMMARY OF INVENTION

Technical Problem

Although the black particles of Patent Literature 1 themselves have high blackness, these particles have poor redispersibility; they may adhere to each other when dried and stored, or may coagulate when redispersed to form a dispersion liquid for forming a coating film. Moreover, coating films obtained using these particles may be uneven, and thus have high total light transmittance and insufficient blackness.

The product with a globular morphology of Non-Patent Literature 1 may not sufficiently prevent color mixing or conduction when used as a material of a black matrix because, for example, the product has low electrical insulation, and particles of the product may adhere to each other when dried or may coagulate when redissolved to form a solution.

In view of the situation, the present invention aims to provide black particles that have high electrical insulation and that can achieve high blackness in the visible light region, as well as a black coating material, a coating film, and a black matrix for a color filter each containing the black particles.

Solution to Problem

The present invention relates to black particles containing a copolymer including a structural unit derived from a pyrrole compound and a structural unit derived from a quinone compound, the black particles having an aqueous dispersion number average particle size of 100 nm or less and a zeta potential of −5 mV or less.

The present invention is described in detail below.

As a result of intensive studies, the present inventors found out that a coating film having high electrical insulation and high blackness can be obtained by using black particles that contain a copolymer including a structural unit derived from a pyrrole compound and a structural unit derived from a quinone compound, that form an aqueous dispersion having a predetermined average particle size, and that have a zeta potential within a predetermined range. The inventors thus completed the present invention.

The black particles of the present invention contain a copolymer including a structural unit derived from a pyrrole compound and a structural unit derived from a quinone compound. The black particles of the present invention preferably contain a copolymer including a structural unit derived from pyrrole and a structural unit derived from benzoquinone.

Black particles containing the copolymer can provide a coating film having high electrical insulation and high blackness.

The pyrrole compound means pyrrole and a pyrrole derivative in which a hydrogen atom of a pyrrole ring is replaced with a substituent.

Examples of the pyrrole compound include compounds represented by the following formula (1).

[Chem. 1]

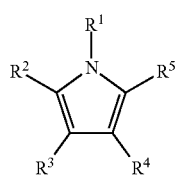

(1)

In the formula (1), $R^1$, $R^2$, $R^3$, $R^4$, and $R^5$ each independently represent a hydrogen atom, a hydroxy group, a carboxy group, a halogen, an amino group, a nitro group, a cyano group, an aldehyde group, an isocyanate group, a C6-C18 arylsulfonyl group, a tosyl group, a silyl group, a furyl group, a pyrrolyl group, a thiol group, a sulfonic acid group, a hydrazide group, an acid halide group, an amide group, a sulfonamide group, a C1-C18 linear or branched alkyl group, a C2-C18 linear or branched alkenyl group, a C6-C18 aryl group, a C7-C20 arylalkyl group, a C7-C20 alkylaryl group, a C2-C10 acyl group, a C1-C6 alkoxy group, a C2-C10 alkoxycarbonyl group, or a C3-C10 alkoxycarbonylalkyl group.

In the alkyl group, the alkenyl group, the aryl group, the arylalkyl group, the alkylaryl group, the acyl group, the alkoxy group, and the alkoxycarbonyl group, at least one hydrogen atom may be replaced with a hydroxy group, a carboxy group, a halogen, an amino group, a nitro group, a cyano group, an aldehyde group, an isocyanate group, a C6-C18 arylsulfonyl group, a tosyl group, a silyl group, a furyl group, a pyrrolyl group, a thiol group, a sulfonic acid group, a hydrazide group, an acid halide group, an amide group, or a sulfonamide group.

Any adjacent two of $R^2$, $R^3$, $R^4$, and $R^5$ may be bonded to form a cyclic structure.

Examples of the cyclic structure formed by bonding of any adjacent two of $R^2$, $R^3$, $R^4$, and $R^5$ include aromatic hydrocarbon rings such as a benzene ring, saturated or unsaturated aliphatic hydrocarbon rings, and heterocycles including any of these rings in which at least one carbon atom forming the ring has been replaced with a hetero atom such as an oxygen, nitrogen, or sulfur atom.

These cyclic structures are preferably four- to ten-membered rings, more preferably five- to eight-membered rings.

Examples of polycyclic pyrrole compounds having the above cyclic structure include condensation compounds of a pyrrole ring and an aromatic ring such as indole, condensation compounds of a pyrrole ring and another heterocycle such as thienopyrrole, and condensation compounds of a pyrrole ring and a pyrrole ring.

$R^2$ and $R^5$ are preferably hydrogen atoms.

$R^3$ and $R^4$ are preferably each a hydrogen atom, a halogen, an amino group, a C1-C3 linear alkyl group, a C3-C5 branched alkyl group, a phenyl group, a methylphenyl group, or an acetyl group.

The pyrrole compound is more preferably a monocyclic compound.

Examples of the pyrrole compound include pyrrole; compounds having a substituent at the 3-position of a pyrrole ring such as 3-acetylpyrrole, 3-acetyl-1-methylpyrrole, pyrrole-3-carboxylic acid, and 3-acetyl-1-tosylpyrrole; compounds having a substituent at the 1-position of a pyrrole ring such as 1-methylpyrrole, 1-ethylpyrrole, 1-(2-cyanoethyl)pyrrole, 1-phenylpyrrole, 1-tosylpyrrole, 1-(2-hydroxyethyl)pyrrole, 1-(3-hydroxypropyl)pyrrole, 1-(triisopropylsilyl)pyrrole, 1-(phenylsulfonyl)pyrrole, 1-(4-chlorophenyl)-1H-pyrrole, 1-(4-iodophenyl)pyrrole, 4-(1H-pyrrol-1-yl)phenol, 1-{3-(bromomethyl)phenyl}-1H-pyrrole, 1-{4-(bromomethyl)phenyl}-1H-pyrrole, 1-(3-isocyanatophenyl)-1H-pyrrole, 3-(1H-pyrrol-1-yl)aniline, 4-(1H-pyrrol-1-yl)aniline, 4-(1H-pyrrol-1-yl)benzaldehyde, 2-(1H-pyrrol-1-yl)benzoic acid, 3-(1H-pyrrol-1-yl)benzoic acid, 4-(1H-pyrrol-1-yl)benzylamine, {2-(1H-pyrrol-1-yl)phenyl}methanol, {4-(1H-pyrrol-1-yl)phenyl}methanol, and N-furfurylpyrrole; compounds having a substituent at the 2-position of a pyrrole ring such as 2-ethylpyrrole, 2,4-dimethylpyrrole, 2-acetylpyrrole, 2-propionylpyrrole, 3-acetyl-2,4-dimethylpyrrole, pyrrole-2-carbonitrile, N-methylpyrrole-2-carboxyaldehyde, pyrrole-2-carboxylic acid, 1-methylpyrrole-2-carboxylic acid, 2-acetyl-1-methylpyrrole, 1-(2-aminophenyl)pyrrole, 1,5-dimethyl-2-pyrrolecarbonitrile, ethyl 2,4-dimethylpyrrole-3,5 dicarboxylate, ethyl 3,5-dimethyl-1H-pyrrolecarboxylate, 1-(4-chlorophenyl)-1H-pyrrole-2-carbaldehyde, and 1H-pyrrole-2-carbohydrazide. Examples also include indole; thienopyrroles such as 4-methyl-4H-thieno{3,2-b}pyrrole-5-carbaldehyde, methyl 6H-thieno{2,3-b}pyrrole-5-carboxylate, 4-methyl-4H-thieno{3,2-b}pyrrole-5-carboxylic acid, 4H-thieno{3,2-b}pyrrole-5-carboxylic acid, and {4-methyl-4H-thieno{3,2-b}pyrrol-5-yl}methanol; and pyrrole ring-condensed polycyclic aromatic compounds such as polypyrrole. The pyrrole compound may be a pyrrole compound having a heterocycle.

Preferred among these are pyrrole, compounds having a substituent at the 1-position, and compounds having a substituent at the 3-position. More preferred are pyrrole, 3-acetylpyrrole, 3-acetyl-1-methylpyrrole, 3-acetyl-1-tosylpyrrole, 1-(2-cyanoethyl)pyrrole, 1-phenylpyrrole, 1-tosylpyrrole, 1-(triisopropylsilyl)pyrrole, 1-(phenylsulfonyl)pyrrole, 1-(4-chlorophenyl)-1H-pyrrole, 1-{3-(bromomethyl)phenyl}-1H-pyrrole, 1-{4-(bromomethyl)phenyl}-1H-pyrrole, and 1-(3-isocyanatophenyl)-1H-pyrrole. Still more preferred is pyrrole.

These pyrrole compounds may be used alone or in combination of two or more thereof.

The quinone compound is an aromatic compound having two carbonyl groups. The quinone compound preferably has a six-membered ring structure derived from a benzene ring.

In the aromatic compound, carbon atoms other than those of the carbonyl groups may have one or more substituents.

Examples of the substituents include a halogen atom, a heterocyclic group, an amino group, a nitro group, a formyl group, a cyano group, a hydroxy group, a C1-C18 linear or branched alkyl group, a C2-C18 linear or branched alkenyl group, a C1-C6 alkoxy group, a thiol group, an alkylthio group, an alkylcarbonyl group, an arylcarbonyl group, an alkylsulfonyl group, and an arylsulfonyl group.

The quinone compound having a six-membered ring structure may have the two carbonyl groups at the ortho or para positon to each other, preferably at the para position.

Examples of the quinone compound having a six-membered ring include compounds represented by the following formulas (2-1) and (2-2).

[Chem. 2]

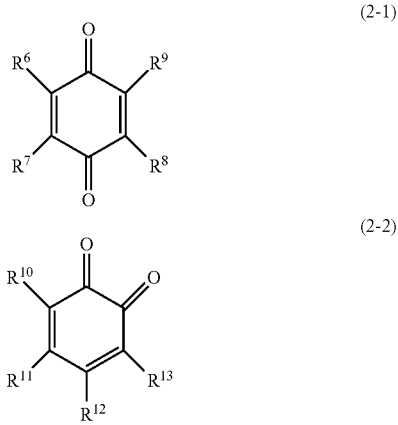

$R^6$, $R^7$, $R^8$, and $R^9$ in the formula (2-1) and $R^{10}$, $R^{11}$, $R^{12}$, and $R^{13}$ in the formula (2-2) each independently represent a hydrogen atom, a halogen atom, a heterocyclic group, an amino group, a nitro group, a formyl group, a cyano group, a hydroxy group, a C1-C18 linear or branched alkyl group, a C2-C18 linear or branched alkenyl group, a C1-C6 alkoxy group, a thiol group, an alkylthio group, alkylcarbonyl group, an arylcarbonyl group, an alkylsulfonyl group, or an arylsulfonyl group.

Specific examples of the quinone compound include p-benzoquinone, p-benzoquinone derivatives such as 2-ethyl-p-benzoquinone, 2-t-butyl-p-benzoquinone, 2-isopentyl-p-benzoquinone, 2,6-diethyl-p-benzoquinone, 2,6-di-t-butyl-p-benzoquinone, 2-bromo-p-benzoquinone, 2,6-dibromo-p-benzoquinone, 2-chloro-p-benzoquinone, 2,6-dichloro-p-benzoquinone, 2-hydroxy-p-benzoquinone, 2,6-dihydroxy-p-benzoquinone, 2-methoxy-p-benzoquinone, and 2,6-dimethoxy-p-benzoquinone, o-benzoquinone, and o-benzoquinone derivatives such as 3-ethyl-o-benzoquinone, 3-t-butyl-o-benzoquinone, 3-isopentyl-o-benzoquinone, 3,6-diethyl-o-benzoquinone, 3-bromo-o-benzoquinone, 3,6-dibromo-o-benzoquinone, 3-chloro-o-benzoquinone, 3,6-dichloro-o-benzoquinone, 3-hydroxy-o-benzoquinone, 3,6-dihydroxy-o-benzoquinone, and 3-methoxy-o-benzoquinone.

The copolymer including a structural unit derived from a pyrrole compound and a structural unit derived from a quinone compound is obtained by oxidative polymerization of the pyrrole compound and the quinone compound. In other words, the copolymer including a structural unit derived from a pyrrole compound and a structural unit derived from a quinone compound is a copolymer of a pyrrole compound and a quinone compound.

In the oxidative polymerization, the molar ratio of the pyrrole compound to the quinone compound (pyrrole compound/quinone compound) is preferably 1/4 or more, more preferably 1/2 or more, and preferably 3/2 or less, more preferably 1/1 or less.

A molar ratio out of the above range may result in low reaction efficiency and low yield, or may result in failure to produce spherical particles.

The temperature in the oxidative polymerization is preferably 0° C. or higher and preferably 50° C. or lower. A temperature out of the range may increase the aqueous dispersion number average particle size.

After the polymerization reaction, the dispersion liquid temperature further needs to be increased. In the case where the dispersion liquid temperature is not increased, the particle shape may be unstable or the particles may adhere to each other, failing to provide desired particles. The temperature is preferably 60° C. or higher and preferably 100° C. or lower.

The polymerization reaction is considered terminated when 70% by weight or more of the monomers have been reacted and polymerized when the amount of monomers remaining in the reaction solution is determined.

The amount of the remaining monomers may be determined by, for example, drying the reaction solution by heating to a temperature not lower than the temperature at which the pyrrole compound and the quinone compound vaporize and measuring the amount of residual solids, or quantitative analysis by gas chromatography.

In the oxidative polymerization, an additive is preferably added.

Examples of the additive include halogen compounds such as iodine, bromine, and chlorine; protonic acids such as sulfuric acid, hydrochloric acid, nitric acid, perchloric acid, fluoroboric acid, and phosphinic acid; salts of these protonic acids; Lewis acids such as aluminum trichloride, iron trichloride, molybdenum chloride, antimony chloride, arsenic pentafluoride, and antimony pentafluoride; organic carboxylic acids such as acetic acid, trifluoroacetic acid, polyethylenecarboxylic acid, formic acid, benzoic acid, and citric acid; salts of these organic carboxylic acids; phenols such as phenol, nitrophenol, and cyanophenol; salts of these phenols; sulfosuccinic acids such as di-2-ethylhexylsulfosuccinic acid and sulfosuccinic acid; salts of sulfosuccinic acids; polymer acids such as polyacrylic acid; alkyl phosphates such as propyl phosphate, butyl phosphate, and hexyl phosphate; polyalkylene oxide phosphates such as polyethylene oxide dodecyl ether phosphate and polyethylene oxide alkyl ether phosphate; salts of alkyl phosphates and salts of polyalkylene oxide phosphates; sulfates such as lauryl sulfate, cetyl sulfate, stearyl sulfate, and lauryl ether sulfate; and salts of these sulfates.

In the oxidative polymerization, adding an acid with weak oxidation power such as those listed above enables production of black particles that can provide a coating film having high electrical insulation and high blackness.

The copolymer including a structural unit derived from a pyrrole compound and a structural unit derived from a quinone compound preferably has a weight average molecular weight of $1 \times 10^6$ or more, more preferably $1 \times 10^7$ or more and preferably $1 \times 10^5$ or less, more preferably $1 \times 10^{13}$ or less.

The weight average molecular weight can be determined by a dynamic light scattering method, for example.

The copolymer including a structural unit derived from a pyrrole compound and a structural unit derived from a quinone compound preferably has a content ratio of nitrogen atoms to carbon atoms (nitrogen atom content/carbon atom content) of 1/115 or more, more preferably 1/12 or more and preferably 1/6 or less, more preferably 1/7 or less.

The total amount of nitrogen atoms and carbon atoms is preferably 75% or more of all atoms. When the total amount is less than 75%, other elements may cause electrical conductivity or cause corrosion of electronic devices.

The copolymer including a structural unit derived from a pyrrole compound and a structural unit derived from a quinone compound preferably has a content ratio of nitrogen atoms to oxygen atoms (nitrogen atom content/oxygen atom content) of 1/15 or more, more preferably 1/10 or more and preferably 20 or less, more preferably 10 or less.

The content ratio can be determined by X-ray photoelectron spectroscopy, for example.

The black particles of the present invention have a zeta potential (surface potential) of −5 mV or less.

The black particles having a zeta potential within the above range can have excellent particle size uniformity to have good dispersibility in a solvent.

The lower limit of the zeta potential is preferably −80 mV, and the upper limit thereof is preferably −20 mV.

The zeta potential can be determined using, for example, a micro-electrophoresis zeta potential analyzer. A solution containing the black particles dispersed therein is poured into a measurement cell, and a voltage is applied thereto under microscopic observation. The potential at which particles stop moving (stand still) is the zeta potential.

Preferably, a coating film of the black particles of the present invention with a particle solid content of 45% by weight and a thickness of 1 μm has an average total light transmittance of 30% or less as measured in a wavelength range of 400 to 800 nm. The black particles having an average total light transmittance within the above range absorb most of visible light to develop high blackness in the visible light region.

The average total light transmittance is more preferably 25% or less.

The lower limit of the average total light transmittance is not limited. The lower it is, the better. The lower limit is preferably 0%. The standard deviation of the measured values is preferably 10% or less. A coating film having a standard deviation of 10% or less is suitable because it is less uneven.

It is preferred that no peak at which the total light transmittance reaches the maximum value is detected in the measurement of the total light transmittance of the black particles of the present invention in a wavelength range of 400 to 800 nm.

The total light transmittance can be measured, for example, using a spectrophotometer equipped with an integrating sphere.

The lower limit of the primary particle size of the black particles of the present invention is preferably 0.005 μm, and the upper limit thereof is preferably 50 μm. The black particles having a primary particle size within the range from 0.005 μm to 50 μm can have sufficient blackness and high dispersibility. The lower limit is more preferably 0.01 μm, and the upper limit is more preferably 40 μm.

The primary particle size can be determined by analyzing, with a particle size distribution analyzer, the reaction solution in which the black particles are formed.

The black particles of the present invention have an aqueous dispersion number average particle size of 100 nm or less.

When the aqueous dispersion number average particle size is 100 nm or less, the resulting coating film can have sufficiently high blackness.

The aqueous dispersion number average particle size is preferably 20 nm or more and preferably 80 nm or less.

The aqueous dispersion number average particle size can be determined by adding dry powder of the black particles to water to a concentration of 0.1% by weight, ultrasonically dispersing the powder to prepare an aqueous dispersion, and analyzing the aqueous dispersion using a particle size distribution analyzer.

The coefficient of variation (CV value) of the particle size of the black particles of the present invention is preferably 20% or lower. When the CV value of the particle size is 20% or lower, the black particles have better monodispersibility, which facilitates close packing of the black particles used as a black pigment. As a result, the effect of blocking visible light can be increased. The upper limit of the CV value of the particle size is more preferably 15%. The lower limit is not particularly limited, and is preferably 0.5%.

The CV value (%) of the particle size is a value in percentage obtained by dividing the standard deviation by the average particle size, i.e., the numerical value obtained by the following equation. A smaller CV value means less variation in particle size.

CV value (%) of particle size=(standard deviation of particle size/aqueous dispersion number average particle size)×100

The particle size and standard deviation can be measured with a FE-SEM.

The black particles of the present invention preferably have an average sphericity of 90% or higher.

With such an average sphericity, the effect of the present invention is better obtained. The lower limit of the average sphericity is more preferably 95%.

The sphericity (breadth/length) can be determined by analyzing an electron micrograph taken with a FE-SEM using an image analyzer. The average sphericity can be calculated by obtaining the average of sphericity values of, for example, arbitrary selected 100 particles in the electron micrograph.

The black particles of the present invention have a specific gravity of 1.80 $g/cm^3$ or less. With the specific gravity of 1.80 $g/cm^3$ or less, the black particles can achieve high dispersibility. The lower limit of the specific gravity is preferably 1.20 $g/cm^3$ and the upper limit thereof is preferably 1.70 $g/cm^3$.

The specific gravity can be measured using an electronic densimeter (ED-120T, produced by Alfa Mirage Inc., Ltd.), for example.

The black particles of the present invention preferably have a volume resistivity of $1.0 \times 10^7$ Ω·cm or more. The volume resistivity of $1.0 \times 10^7$ Ω·cm or more ensures high insulation properties. The volume resistivity is more preferably $1.0 \times 10^8$ Ω·cm or more, still more preferably $1.0 \times 10^{11}$ Ω·cm or more. The volume resistivity is preferably $1.0 \times 10^{18}$ Ω·cm or less.

The volume resistivity can be measured using a powder resistivity measurement system (produced by Mitsubishi Chemical Analytech Co., Ltd.), for example.

The black particles of the present invention may be produced by a method including mixing and reacting the pyrrole compound, the quinone compound, and the additive, for example.

A specific exemplary method includes preparing an aqueous pyrrole compound solution containing the pyrrole compound and the additive and then dripping, to the aqueous solution, a quinone compound solution prepared by adding the quinone compound to a solvent such as ethanol or water.

The amount of the pyrrole compound in the aqueous pyrrole compound solution relative to 100 parts by weight of water is preferably 0.1 parts by weight or more and preferably 2 parts by weight or less.

The amount of the additive in the aqueous pyrrole compound solution relative to 100 parts by weight of the pyrrole compound is preferably 0.01 parts by weight or more and preferably 1 part by weight or less.

The amount of the quinone compound added relative to 1 mol of the pyrrole compound is preferably 0.7 mol or more and preferably 4 mol or less.

The temperature in the reaction is preferably 0° C. or higher and preferably 50° C. or lower.

The reaction time is preferably 4 hours or longer and preferably 48 hours or shorter.

The termination of the reaction means that 70% by weight or more of the monomers has been reacted.

For example, the termination of the reaction can be determined by drying the particle dispersion liquid by heating at a temperature not lower than the temperature at which the pyrrole compound and the quinone compound vaporize, and determining if the amount of residual solids is 70% by weight or more of the amount of the monomers charged as raw materials. Unreacted pyrrole compound and quinone compound are vaporized by the above drying and do not remain as solids.

For example, pyrrole has a boiling point of 129° C., and p-benzoquinone has a sublimation temperature of 115° C. Thus, drying under the conditions of 130° C. and 30 minutes vaporizes pyrrole and p-benzoquinone. In contrast, the polymer after the reaction does not vaporize under the above conditions and remains as solids. Drying under the above conditions therefore can show how much of the monomers have been polymerized.

Depending on the types of the pyrrole compound and the quinone compound, drying may be performed at higher temperature to determine the proportion of the residual solids.

Alternatively, the termination of the reaction can be determined by quantitatively analyzing the reaction solution by gas chromatography to determine the proportion of residual monomers.

The method for producing the black particles may further include a drying step.

The drying temperature in the drying step is preferably 100° C. or higher and preferably 220° C. or lower. After termination of the reaction, the particle dispersion liquid is preferably further heated to 60° C. or higher and 100° C. or lower. Because the particles upon termination of the reaction are in a soft resin state, drying treatment or the like on the particles as they are may impair the particle shape.

The drying time is preferably 3 hours or longer and preferably 48 hours or shorter.

The black particles of the present invention can be used for applications such as a coating film, a black coating material, and a black matrix for a color filter.

The coating film, the black coating material, and the black matrix for a color filter are also encompassed by the present invention.

An exemplary method for forming the black matrix of the present invention is described below.

First, the black particles of the present invention, a curable compound, and an optional component such as a curing agent or a solvent are mixed in a stirring device to prepare a composition containing the black particles.

Next, the composition is applied to a substrate formed of glass, polyethylene terephthalate, an acrylic resin, polycarbonate, or the like using a contact-type coater such as a roll coater, a reverse coater, a gravure coater, a comma coater, or a bar coater, or a contactless coater such as a spin coater, a slit coater, or a curtain flow coater.

Then, the applied composition is dried by, for example, low-pressure drying at room temperature using a vacuum drier and subsequent drying at 80° C. or higher and 120° C. or lower, preferably 90° C. or higher and 100° C. or lower for 60 seconds or longer and 180 seconds or shorter using a hot plate or an oven. Thus, a coating film is formed.

The obtained coating film is partly exposed to active energy rays such as UV light or excimer laser light through a negative mask. Before irradiation with active energy rays, the obtained coating film and a negative mask are preferably irradiated with near infrared rays for positioning of them by near-IR alignment.

The energy dose for the irradiation varies according to the formulation of the resin composition of the present invention, and is preferably 100 to 2,000 mJ/cm.

The coating film after exposure is patterned in a desired pattern by development using an aqueous alkaline solution. The developing method using an aqueous alkaline solution may be, for example, an immersion method, a spraying method, and a paddle method. Examples of the aqueous alkaline solution used as a developing solution include aqueous solutions of sodium hydroxide, potassium hydroxide, sodium carbonate, ammonia, tetramethyl ammonium hydroxide, and quaternary ammonium salt.

In the case where a developing solution containing an aqueous alkaline solution is used, commonly, the excess of the developing solution is removed by washing (rinsing) with pure water after the development.

The pattern after the development is subjected to post baking at around 220° C. to 250° C., preferably around 230° C. to 240° C., if needed. At that time, the formed pattern is preferably entirely exposed before post baking.

As above, a black matrix having a predetermined pattern can be formed.

Examples of the curable compound include styrene compounds, phenoxy compounds, oxetane compounds, epoxy compounds, episulfide compounds, (meth)acrylic compounds, unsaturated polyester compounds, polyurethane compounds, silicone compounds, polyimide compounds, and allyl alcohol derivatives. These curable compounds may be used alone or in combination of two or more thereof.

The curable compound may be a compound having a molecular weight of less than 10,000 or a compound having a molecular weight or 10,000 or more. Alternatively, such two compounds may be used in combination.

Examples of the styrene compounds include homopolymers of styrenic monomers and copolymers of styrenic monomers and acrylic monomers.

Examples of the styrenic monomers include styrene, o-styrene, m-styrene, p-styrene, p-methoxystyrene, p-phenylstyrene, p-chlorostyrene, p-ethylstyrene, p-n-butylstyrene, p-tert-butylstyrene, p-n-hexylstyrene, p-n-octylstyrene, p-n-nonylstyrene, p-n-decylstyrene, p-n-dodecylstyrene, 2,4-dimethylstyrene, and 3,4-dichlorostyrene.

Examples of the phenoxy compounds include resins obtained by reacting epihalohydrin and divalent phenol compounds and resins obtained by reacting divalent epoxy compounds and divalent phenol compounds.

Specific examples thereof include compounds having a bisphenol A type skeleton, a bisphenol F type skeleton, a bisphenol A/F mixed type skeleton, a naphthalene skeleton, a fluorene skeleton, a biphenyl skeleton, an anthracene skeleton, a pyrene skeleton, a xanthene skeleton, an adamantane skeleton, or a dicyclopentadiene skeleton.

Examples of the oxetane compounds include allyloxyoxetane, phenoxymethyloxetane, 3-ethyl-3-hydroxymethyloxetane, 3-ethyl-3-(phenoxymethyl)oxetane, 3-ethyl-3-((2-ethylhexyloxy)methyl)oxetane, 3-ethyl-3-((3-(triethoxysilyl)propoxy)methyl)oxetane, 3-ethyl-3-(((3-ethyloxetan-3-yl)methoxy)methyl)oxetane, oxetanyl silsesquioxane, phenol novolac oxetane, and 1,4-bis(((3-ethyl-3-oxetanyl)methoxy)methyl)benzene.

Examples of the epoxy compounds include bisphenol A type epoxy resins, bisphenol E type epoxy resins, bisphenol F type epoxy resins, bisphenol S type epoxy resins, bisphenol O type epoxy resins, 2,2'-diallyl bisphenol A type epoxy resins, cycloaliphatic epoxy resins, hydrogenated bisphenol type epoxy resins, propylene oxide-added bisphenol A type epoxy resins, resorcinol type epoxy resins, biphenyl type epoxy resins, sulfide type epoxy resins, diphenyl ether type epoxy resins, dicyclopentadiene type epoxy resins, naphthalene type epoxy resin, phenol novolac type epoxy resins, ortho cresol novolac type epoxy resins, dicyclopentadiene novolac type epoxy resins, biphenyl novolac type epoxy resins, naphthalenephenol novolac type epoxy resins, glycidylamine type epoxy resins, alkylpolyol type epoxy resins, rubber-modified epoxy resins, and glycidyl ester compounds.

Examples of the episulfide compounds include episulfide compounds obtainable by converting epoxy groups in epoxy compounds to episulfide groups.

Examples of the (meth)acrylic compounds include ester compounds obtainable by reacting (meth)acrylic acid with hydroxy group-containing compounds, epoxy (meth)acrylates obtainable by reacting (meth)acrylic acid with epoxy compounds, and urethane (meth)acrylates obtainable by reacting isocyanate compounds with hydroxy group-containing (meth)acrylic acid derivatives.

Examples of the ester compounds include monofunctional ester compounds including imide acrylates such as phthalimide acrylates (e.g., N-acryloyloxyethyl hexahydrophthalimide), methyl (meth)acrylate, ethyl (meth)acrylate, propyl (meth)acrylate, n-butyl (meth)acrylate, isobutyl (meth)acrylate, t-butyl (meth)acrylate, n-octyl (meth)acrylate, isooctyl (meth)acrylate, 2-ethylhexyl (meth)acrylate, isononyl (meth)acrylate, isodecyl (meth)acrylate, lauryl (meth)acrylate, isomyristyl (meth)acrylate, stearyl (meth)acrylate, cyclohexyl (meth)acrylate, isobornyl (meth)acrylate, dicyclopentenyl (meth)acrylate, benzyl (meth)acrylate, 2-hydroxyethyl (meth)acrylate, 2-hydroxypropyl (meth)acrylate, 2-hydroxybutyl (meth)acrylate, 4-hydroxybutyl (meth)acrylate, 2-methoxyethyl (meth)acrylate, 2-ethoxyethyl (meth)acrylate, 2-butoxyethyl (meth)acrylate, methoxyethylene glycol (meth)acrylate, methoxypolyethylene glycol (meth)acrylate, ethyl carbitol (meth)acrylate, tetrahydrofurfuryl (meth)acrylate, 2-phenoxyethyl (meth)acrylate, phenoxydiethylene glycol (meth)acrylate, phenoxypolyethylene glycol (meth)acrylate, 2,2,2-trifluoroethyl (meth)acrylate, 2,2,3,3-tetrafluoropropyl (meth)acrylate, 1H,1H,5H-octafluoropentyl (meth)acrylate, dimethylaminoethyl (meth)acrylate, diethylaminoethyl (meth)acrylate, 2-(meth)acryloyloxyethyl succinate, 2-(meth)acryloyloxyethyl hexahydrophthalate, 2-(meth)acryloyloxyethyl 2-hydroxypropylphthalate, glycidyl(meth)acrylate, and 2-(meth)acryloyloxyethyl phosphate.

The examples also include bifunctional ester compounds including 1,3-butanediol di(meth)acrylate, 1,4-butanediol di(meth)acrylate, 1,6-hexanediol di(meth)acrylate, 1,9-nonanediol di(meth)acrylate, 1,10-decanediol di(meth)acrylate, 2-n-butyl-2-ethyl-1,3-propanediol di(meth)acrylate, ethylene glycol di(meth)acrylate, diethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol (meth)acrylate, ethylene oxide-added bisphenol A di(meth)acrylate, propylene oxide-added bisphenol A di(meth)acrylate, ethylene oxide-added bisphenol F di(meth)acrylate, dimethylol dicyclopentadienyl di(meth)acrylate, neopentyl glycol di(meth)acrylate, ethylene oxide-modified isocyanuric acid di(meth)acrylate, 2-hydroxy-3-(meth)acryloyloxypropyl (meth)acrylate, carbonate diol di. (meth)acrylate, polyether diol di(meth)acrylate, polyester diol di(meth) acrylate, polycaprolactone diol di(meth)acrylate, and polybutadiene diol di(meth)acrylate.

The examples further include tri- or higher functional ester compounds including trimethyrolpropane tri(meth)acrylate, ethylene oxide-added trimethyrolpropane tri(meth)acrylate, propylene oxide-added trimethyrolpropane tri(meth)acrylate, caprolactone-modified trimethyrolpropane tri(meth)acrylate, pentaerythritol tri(meth)acrylate, ethylene oxide-added isocyanuric acid tri(meth)acrylate, glycerol tri(meth)acrylate, propylene oxide-added glycerol tri(meth)acrylate, tris(meth)acryloyloxyethyl phosphate, ditrimethylolpropane tetra(meth)acrylate, pentaerythritol tetra(meth)acrylate, dipentaerythritol penta(meth)acrylate, and dipentaerythritol hexa(meth)acrylate.

Examples of the epoxy (meth)acrylate include those obtainable by reacting epoxy compounds with (meth)acrylic acid in the presence of basic catalysts by common methods.

Examples of the allyl alcohol derivatives include diallyl compounds such as diallyl maleate, diallyl adipate, diallyl phthalate, glycerol 1,3-diallyl ether, and trimethylolpropane diallyl ether, triallyl cyanurate, triallyl isocyanurate, triallyl trimellitate, and pentaerythritol triallyl ether.

The above operation for forming the black matrix of the present invention is performed also for a photosensitive resin composition in which a red pigment is dispersed, a photosensitive resin composition in which a green pigment is dispersed, and a photosensitive resin composition in which a blue pigment is dispersed, thereby forming a pixel pattern for each color. Thus, a color filter can be formed.

Conventionally known compositions may be used for the photosensitive resin composition in which a red pigment is dispersed, the photosensitive resin composition in which a green pigment is dispersed, and the photosensitive resin composition in which a blue pigment is dispersed.

The color filter can be also produced by a method including discharging red, green, and blue inks from ink-jet nozzles into regions defined by the black matrix of the present invention and curing the discharged ink with heat or light.

The color filter can be suitably used as a member of a display device such as a liquid crystal display device or an organic electroluminescent display device.

Advantageous Effects of Invention

The present invention can provide black particles that have high electrical insulation and that can achieve high blackness in the visible light region, as well as a black coating material, a coating film, and a black matrix for a color filter each containing the black particles.

DESCRIPTION OF EMBODIMENTS

Embodiments of the present invention are more specifically described with reference to, but not limited to, examples below.

Example 1

First, 6.7 g (0.1 mol) of pyrrole (produced by Tokyo Chemical Industry Co., Ltd.) was dissolved in 1.4 L of water, to which was then added 1.75 g of formic acid (produced by Tokyo Chemical Industry Co., Ltd.), followed by stirring. Thus, an aqueous pyrrole solution was prepared.

Separately, 10.8 g (0.1 mol) of p-benzoquinone (produced by Tokyo Chemical Industry Co., Ltd.) was dissolved in a solution mixture of 0.35 L of water and 0.35 L of ethanol to prepare a p-benzoquinone solution.

The p-benzoquinone solution was dripped into the obtained aqueous pyrrole solution and mixed to prepare a mixture.

The mixture was stirred at room temperature (25° C.) for 48 hours, then heated to 60° C., and stirred for an additional 48 hours. Subsequently, the solvents (e.g., water) were removed, and the obtained product was dried at 100° C. for 16 hours and then heat-treated at 220° C. for 3 hours to prepare dry powder of black particles containing a copolymer including a structural unit derived from pyrrole and a structural unit derived from p-benzoquinone.

Here, a mixture was prepared in the same manner as above, stirred at room temperature (25° C.) for 48 hours, and then dried at 130° C. for 30 minutes. The amount of the resulting residual solids was 70% by weight or more of the amount of the pyrrole and the p-benzoquinone added. At 130° C. or higher, pyrrole and p-benzoquinone vaporize and do not remain as solids, considering the boiling point of pyrrole and the melting point (sublimation) of p-benzoquinone. The amount of residual solids after drying, however, was greater than the amount of pyrrole charged, suggesting that a copolymer of pyrrole and p-benzoquinone was obtained.

Figure 1:
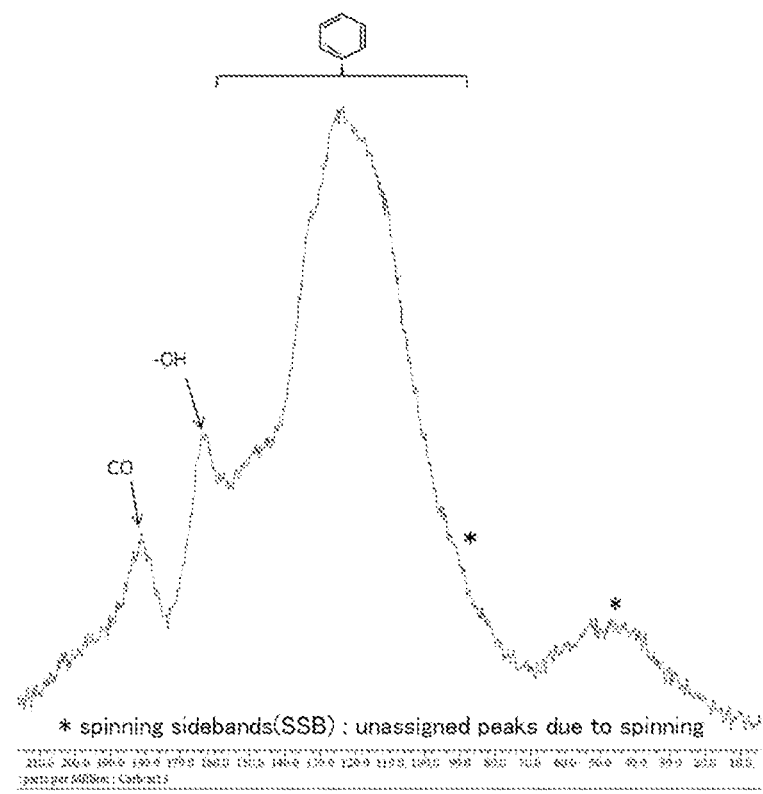
FIG. 1 shows results of solid $^{13}$C-NMR of dry powder of black particles obtained in Example 1.

Solid $^{13}$C-NMR measurement of the dry powder of black particles obtained in Example 1 gave results as shown in FIG. 1. FIG. 1 shows significant peak broadening, suggesting that the resin is not a single-structure resin. The results show that most of the carbon atoms of the resin forming the black particles are aromatic carbon and hardly include single aliphatic carbon or double-bonded carbon. This indicates that the pyrrole ring and the benzoquinone ring of the raw materials turned into a condensed ring structure to provide, for example, a copolymer having a partial structure such as one represented by the following formula (3).

[Chem. 3]

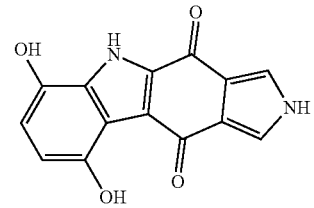

(3)

Figure 2:
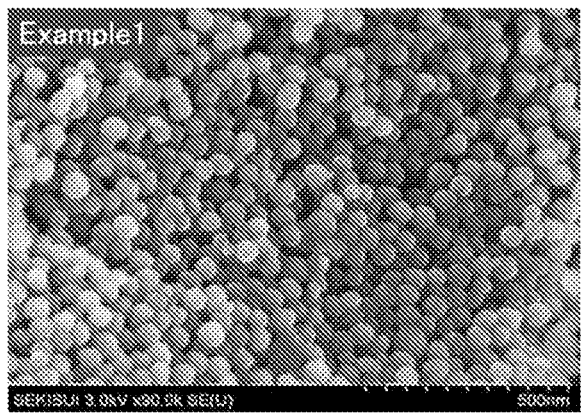
FIG. 2 is a FE-SEM image of an aqueous solution obtained by adding the dry powder of black particles obtained in Example 1 to a concentration of 0.1% by weight and redispersing the powder.

The obtained dry powder of black particles was added to water to a concentration of 0.1% by weight and redispersed to prepare an aqueous solution. A micrograph of the obtained aqueous solution taken using a FE-SEM is shown in FIG. 2. FIG. 2 shows that the black particles obtained in Example 1 have high dispersibility even when redispersed.

Example 2

Dry powder of black particles was obtained as in Example 1 except that phosphinic acid was used instead of formic acid.

Figure 3:
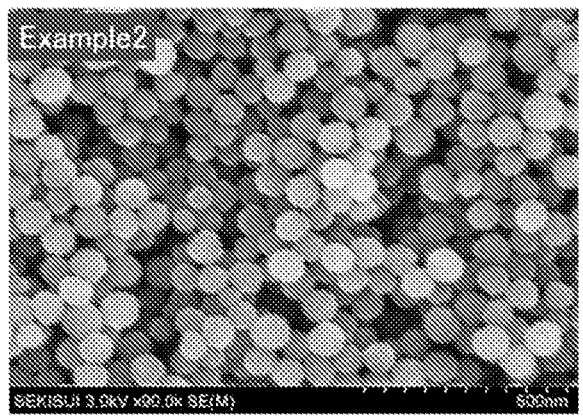
FIG. 3 is a FE-SEM image of an aqueous solution obtained by adding dry powder of black particles obtained in Example 2 to a concentration of 0.1% by weight and redispersing the powder.

The dry powder was redispersed to prepare an aqueous solution as in Example 1. A micrograph of the aqueous solution taken using a FE-SEM is shown in FIG. 3. FIG. 3 showed that the black particles obtained in Example 2 have high dispersibility even when redispersed.

Example 3

Dry powder of black particles was obtained as in Example 1 except that a 0.01 M aqueous hydrochloric acid solution was used instead of formic acid.

Figure 4:
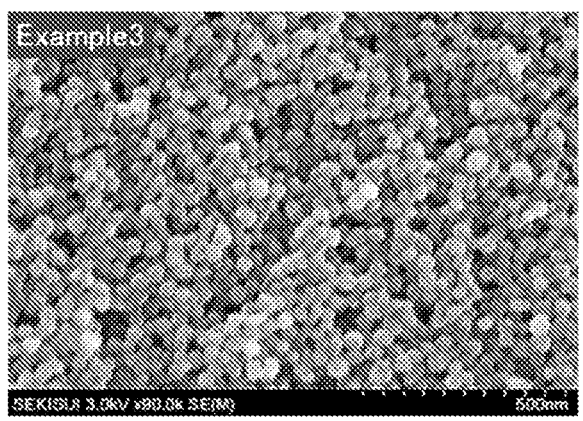
FIG. 4 is a FE-SEM image of an aqueous solution obtained by adding dry powder of black particles obtained in Example 3 to a concentration of 0.1% by weight and redispersing the powder.

The dry powder was redispersed to prepare an aqueous solution as in Example 1. A micrograph of the aqueous solution taken using a FE-SEM is shown in FIG. 4. FIG. 4 shows that the black particles obtained in Example 3 have high dispersibility even when redispersed.

Example 4

Dry powder of black particles was obtained as in Example 1 except that citric acid was used instead of formic acid.

Figure 5:
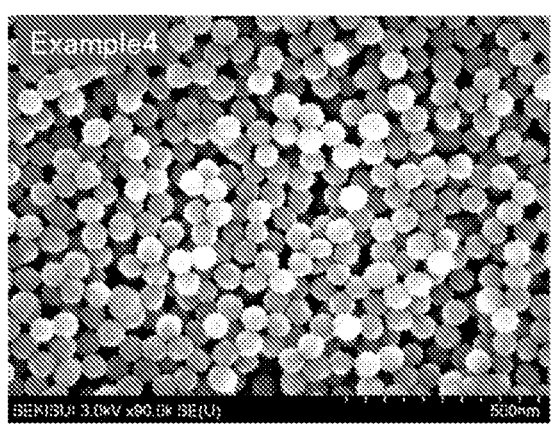
FIG. 5 is a FE-SEM image of an aqueous solution obtained by adding dry powder of black particles obtained in Example 4 to a concentration of 0.1% by weight and redispersing the powder.

The dry powder was redispersed to prepare an aqueous solution as in Example 1. A micrograph of the aqueous solution taken using a FE-SEM is shown in FIG. 5. FIG. 5 shows that the black particles obtained in Example 4 have high dispersibility even when redispersed.

Example 5

Dry powder of black particles was obtained as in Example 1 except that the obtained mixture was stirred at 45° C. for 2 hours, then heated to 80° C., and stirred for an additional 48 hours.

Figure 6:
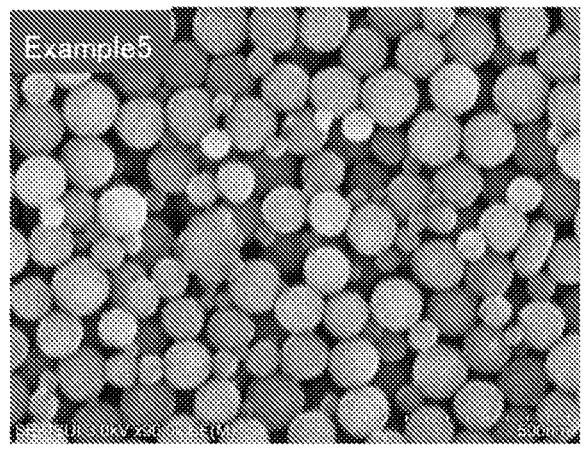
FIG. 6 is a FE-SEM image of an aqueous solution obtained by adding dry powder of black particles obtained in Example 5 to a concentration of 0.1% by weight and redispersing the powder.

The dry powder was redispersed to prepare an aqueous solution as in Example 1. A micrograph of the aqueous solution taken using a FE-SEM is shown in FIG. 6. FIG. 6 shows that the black particles obtained in Example 5 have high dispersibility even when redispersed.

Comparative Example 1

First, 6.7 g (0.1 mol) of pyrrole (produced by Tokyo Chemical Industry Co., Ltd.) was dissolved in 1.75 L of water, to which was then added 17.5 g of ammonium persulphate (produced by FUJIFILM Wako Pure Chemical Corporation), followed by stirring. Thus, an aqueous pyrrole solution was obtained.

The obtained aqueous pyrrole solution was stirred at room temperature (25° C.) for 48 hours, then heated to 60° C., and stirred for an additional 48 hours. The solvent (e.g., water) was then removed, and the obtained product was dried at 100° C. for 16 hours and further heat-treated at 220° C. for 3 hours, whereby a dry product was obtained. A precipitate was formed during stirring the aqueous pyrrole solution. The dry product was clumpy, and no particulate dry substance was obtained.

Figure 7:
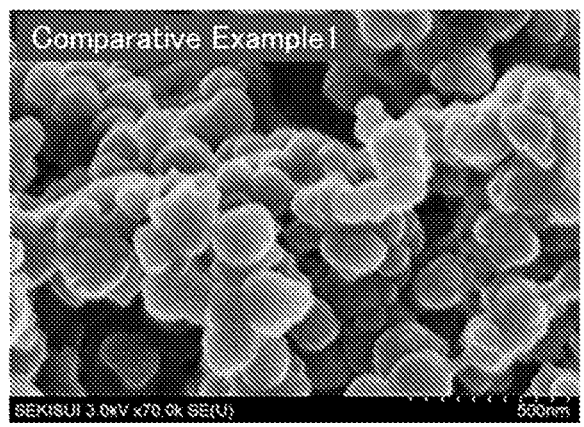
FIG. 7 is a FE-SEM image of an aqueous solution obtained by adding a dry product obtained in Comparative Example 1 to a concentration of 0.1% by weight and redispersing the product.

The dry product was redispersed to prepare an aqueous solution as in Example 1. A micrograph of the aqueous solution taken using a FE-SEM is shown in FIG. 7. FIG. 7 shows that the dry product obtained in Comparative Example 1 is clumpy and not sufficiently redispersed in water.

Comparative Example 2

Ketjen black ("EC600JD", produced by Lion Specialty Chemicals Co., Ltd.) was used as dry powder of black particles.

Comparative Example 3

First, 1.20 g of 1,5-dihydroxynaphthalene (1,5-DHN, produced by Tokyo Chemical Industry Co., Ltd.) and 0.98 g of 1,3,5-triazine (produced by Tokyo Chemical Industry Co., Ltd.) were sequentially dissolved in 50 ml of ethanol to prepare a mixture solution in ethanol.

Next, the obtained mixture solution was stirred under heat at 80° C. for one hour (rotation rate: 300 rpm). The solution was filtered through a glass filter, and the obtained particles were washed with ethanol three times and vacuum-dried at 50° C. for three hours, followed by heating at 110° C. for two hours. Thus, dry powder of black carbon particles was obtained.

The black particles and dry product of the examples and the comparative examples were evaluated as follows. Table 1 shows the results.

Comparative Example 4

Dry powder of black particles was obtained as in Example 1 except that boric acid was used instead of formic acid.

Comparative Example 5

Dry powder of black particles was obtained as in Example 1 except that no formic acid was added.

(1) Aqueous Dispersion Number Average Particle Size

The dry powder of each of the examples and the comparative examples was added to water to prepare 10 ml of an aqueous dispersion having a concentration of 0.1% by weight. The aqueous dispersion was exposed to ultrasonic waves at 45 kHz for 30 minutes to prepare an aqueous dispersion liquid. The obtained dispersion liquid was used to measure the average particle size using a dynamic light scattering (DLS)-type particle size distribution analyzer ("Nanotrac Wave II", produced by MicrotracBEL Corp.) under the conditions of true sphere approximation, absorption of irradiation light, and number distribution.

Comparative Example 1 was not evaluated because no dry powder was obtained.

(2) Zeta Potential

The zeta potential of the black particles of the examples and the comparative examples was measured using a micro-electrophoresis zeta potential analyzer ("MODEL 502", produced by Nihon Rufuto Co., Ltd.). Specifically, a KCl aqueous solution (concentration: 0.01 M) was used as a support electrolyte, and a small amount of black particles were dispersed therein. The KCl solution was injected into a measurement cell. A voltage was applied thereto under observation using a microscope and adjusted until the particles stopped moving (became still). The potential at that time was taken as the zeta potential.

Comparative Example 1 was not evaluated because no dry powder was obtained.

(3) Weight Average Molecular Weight

For the black particles obtained in Examples 1 to 5 and Comparative Examples 3 to 5, the dispersion liquid obtained in "(1) Aqueous dispersion number average particle size" was analyzed using a dynamic light scattering (DLS)-type weight average molecular weight measurement device ("Nanotrac Wave II", produced by MicrotracBEL Corp.) to measure the weight average molecular weight of the copolymer.

(4) Volume Resistivity

The volume resistivity of the black particles and the dry product of the examples and the comparative examples was measured by measuring the volume resistance value at a load of 20 kN using a powder resistivity measurement system (produced by Mitsubishi Chemical Analytech Co., Ltd.).

(5) Total Light Transmittance

A mixture of 2-hydroxyethyl methacrylate (produced by FUJIFILM Wako Pure Chemical Corporation), diallyl phthalate (produced by FUJIFILM Wako Pure Chemical Corporation), ditrimethylolpropane tetraacrylate (produced by Shin-Nakamura Chemical Co., Ltd.), and urethane acrylate (U-4HA, produced by Shin-Nakamura Chemical Co., Ltd.) at a weight ratio of 3:1:1:1 was used as a curable compound. IRGACURE 907 (produced by BASF) was used as a curing agent.

First, 45 parts by weight of the dry powder or dry product obtained in one of the examples and the comparative examples, 52.4 parts by weight of the curable compound, and 2.6 parts by weight of the curing agent were mixed at room temperature to prepare a resin composition.

The obtained resin composition was applied to a glass slide and then irradiated with ultraviolet light at 3,500 mJ/cm using a high-pressure mercury lamp to prepare a 1-μm-thick coating film. The light transmittance of the obtained coating film in the whole visible light region from 400 to 800 nm was measured at 10 points using a spectrophotometer equipped with an integrating sphere ("U-4100 type", produced by Hitachi, Ltd.). The average transmittance and the standard deviation of the measurements at the 10 points were determined. The resin compositions obtained using the dry powders or the dry product obtained in the comparative examples were not uniform. As a result, the compositions failed to form uniform coating films, resulting in great variation in transmittance.

Here, the total light reflectance is greatly affected by the reflectance of measurement fixtures. Measuring total light transmittance thus allows more accurate measurement of the blackness of coating films.

(6) Element Content (Atom %)

The black particles and the dry product of the examples and the comparative examples were analyzed by X-ray photoelectron spectroscopy (XPS) to measure the element contents (atom %).

TABLE 1

| | Evaluation | | | | | | | | | |
|---|---|---|---|---|---|---|---|---|---|---|
| | Aqueous dispersion number average particle size (nm) | Zeta potential (mV) | Weight average molecular weight | Volume resistivity ($\Omega \cdot cm$) | Total light transmittance | | Element content (atom %) | | | |
| | | | | | Average (%) | Standard deviation (%) | C | N | O | Other elements |
| Example 1 | 61 | −45 | $5.8 \times 10^8$ | $1 \times 10^7$ or more | 21 | 10 | 70 | 9 | 21 | 0 |
| Example 2 | 65 | −37 | $1.0 \times 10^8$ | $1 \times 10^7$ or more | 17 | 8 | 69 | 8 | 22 | 1 |
| Example 3 | 50 | −44 | $1.5 \times 10^9$ | $1 \times 10^7$ or more | 18 | 8 | 74 | 6 | 19 | 1 |
| Example 4 | 72 | −11 | $9.3 \times 10^8$ | $1 \times 10^7$ or more | 22 | 9 | 72 | 9 | 17 | 2 |
| Example 5 | 95 | −27 | $2.8 \times 10^{13}$ | $1 \times 10^7$ or more | 24 | 9 | 70 | 8 | 20 | 2 |
| Comparative Example 1 | — | — | — | $5.7 \times 10^4$ | 55 | 33 | 58 | 13 | 25 | 4 |
| Comparative Example 2 | 177 | −27 | — | $1.8 \times 10^{-2}$ | 78 | 25 | 94 | 1 | 5 | 0 |
| Comparative Example 3 | 200 | −25 | $6.0 \times 10^7$ | $1 \times 10^7$ or more | 30 | 12 | 79 | 5 | 16 | 0 |
| Comparative Example 4 | 510 | −2 | $8.9 \times 10^6$ | $8.9 \times 10^6$ | 66 | 18 | 69 | 4 | 20 | 7 |
| Comparative Example 5 | 655 | 14 | $4.1 \times 10^6$ | $1 \times 10^7$ or more | 71 | 29 | 73 | 2 | 25 | 0 |

INDUSTRIAL APPLICABILITY

The present invention can provide black particles that have high electrical insulation and that can achieve high blackness in the visible light region, as well as a black coating material, a coating film, and a black matrix for a color filter each containing the black particles.

The invention claimed is:

1. Black particles comprising
a copolymer including a structural unit derived from a pyrrole compound and a structural unit derived from a quinone compound,
the copolymer having a condensed aromatic ring structure formed by a ring of the pyrrole compound with a ring of the quinone compound,
the copolymer having a weight average molecular weight of $1\times10^6$ or more and $1\times10^{15}$ or less,
the black particles having an aqueous dispersion number average particle size of 100 nm or less, an average sphericity of 90% or higher, and a zeta potential of −5 mV or less.

2. The black particles according to claim 1,
wherein the black particles contain a copolymer including a structural unit derived from pyrrole and a structural unit derived from benzoquinone.

3. A black coating material comprising
the black particles according to claim 1.

4. A coating film comprising
the black particles according to claim 1.

5. A black matrix for a color filter, the black matrix comprising
the black particles according to claim 1.

6. A black coating material comprising
the black particles according to claim 2.

7. A coating film comprising
the black particles according to claim 2.

8. A black matrix for a color filter, the black matrix comprising
the black particles according to claim 2.

* * * * *